US012737754B2

(12) United States Patent
Wong et al.

(10) Patent No.: US 12,737,754 B2
(45) Date of Patent: Sep. 15, 2026

(54) REWARDS-BASED PAYMENTS

(71) Applicant: Samsung Electronics Company, Ltd., Suwon si (KR)

(72) Inventors: Erick H. Wong, Vancouver (CA); Alexi Jordanov, New Westminster (CA); Sean O'Brien, Vancouver (CA)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 4 days.

(21) Appl. No.: 18/919,073

(22) Filed: Oct. 17, 2024

(65) Prior Publication Data

US 2025/0148496 A1 May 8, 2025

Related U.S. Application Data

(63) Continuation of application No. 16/002,438, filed on Jun. 7, 2018, now abandoned.

(51) Int. Cl.
*G06Q 30/00* (2023.01)
*G06Q 20/36* (2012.01)
(Continued)

(52) U.S. Cl.
CPC ......... *G06Q 20/387* (2013.01); *G06Q 20/363* (2013.01); *G06Q 20/40* (2013.01);
(Continued)

(58) Field of Classification Search
None
See application file for complete search history.

(56) References Cited

U.S. PATENT DOCUMENTS 8,332,290 B1 * 12/2012 Venturo ................ G06Q 30/00 705/33
10,223,708 B2 * 3/2019 Pirillo ............... G06Q 30/0239
(Continued)

FOREIGN PATENT DOCUMENTS

AU 2012209213 B2 * 5/2016 ......... G06Q 30/0226
WO WO-2012054786 A1 * 4/2012 ............. G06Q 10/40
WO WO-2012112822 A2 * 8/2012 ............. G06Q 20/20

OTHER PUBLICATIONS

Arnfield, Robin. "Mobile Wallets 101." Retrieved Sep. 15, 2015: 2015. (Year: 2015).*

(Continued)

*Primary Examiner* — Michael Bekerman
(74) *Attorney, Agent, or Firm* — Baker Botts L.L.P.

(57) ABSTRACT

In one embodiment, a method includes receiving at a server computing device of an institution network via the institution network a first notification comprising token-based interaction requests for a user interaction with an entity and a second notification indicating an authorization of a non-token based interaction request of the user interaction by a communication network, wherein the entity and the communication network are each separate from the institution network, sending a third notification identifying the user interaction, a client computing device or a user, and the token-based interaction requests by the server computing device to an institution, receiving a fourth notification authorizing the token-based interaction requests at the server computing device and from the institution via the institution network, and sending a fifth notification to the client computing device updating that the token-based interaction requests having been applied to the user interaction by the server computing device.

18 Claims, 5 Drawing Sheets

(51) Int. Cl.

| | |
|---|---|
| ***G06Q 20/38*** | (2012.01) |
| ***G06Q 20/40*** | (2012.01) |
| ***G06Q 30/0207*** | (2023.01) |
| ***G06Q 30/0226*** | (2023.01) |
| ***G06Q 30/0234*** | (2023.01) |
| *G06Q 20/20* | (2012.01) |
| *G06Q 30/0238* | (2023.01) |

(52) U.S. Cl.

CPC ..... *G06Q 30/0222* (2013.01); *G06Q 30/0231* (2013.01); *G06Q 30/0233* (2013.01); *G06Q 30/0234* (2013.01); *G06Q 20/202* (2013.01); *G06Q 30/0238* (2013.01)

(56) References Cited

U.S. PATENT DOCUMENTS

| | | | | |
|---|---|---|---|---|
| 10,885,541 | B1* | 1/2021 | Ho | G06Q 20/409 |
| 2003/0236704 | A1* | 12/2003 | Antonucci | G06Q 30/0283 705/14.3 |
| 2009/0106112 | A1* | 4/2009 | Dalmia | G06Q 20/40 709/204 |
| 2010/0174596 | A1* | 7/2010 | Gilman | G07G 1/14 705/14.23 |
| 2011/0060629 | A1* | 3/2011 | Yoder | G06Q 20/10 705/14.1 |
| 2013/0325569 | A1* | 12/2013 | Holmes | G06Q 30/0251 705/14.57 |
| 2014/0052617 | A1* | 2/2014 | Chawla | G06Q 20/102 705/39 |
| 2014/0108120 | A1* | 4/2014 | Pirillo | G06Q 30/0226 705/14.27 |
| 2014/0188586 | A1* | 7/2014 | Carpenter | G06Q 20/3821 705/14.23 |
| 2015/0120429 | A1* | 4/2015 | Salmon | G06Q 30/0233 705/14.33 |
| 2016/0012465 | A1* | 1/2016 | Sharp | G06Q 20/321 705/14.17 |
| 2017/0132653 | A1* | 5/2017 | Venugopalan | G06Q 20/3678 |
| 2017/0293926 | A1* | 10/2017 | Clark | G06Q 20/381 |
| 2018/0285916 | A1* | 10/2018 | Althauser | G06Q 20/387 |
| 2019/0057412 | A1* | 2/2019 | Bhattacharjee | G06Q 20/387 |
| 2019/0355005 | A1* | 11/2019 | Kappagantu | H04L 9/3236 |
| 2019/0378125 | A1* | 12/2019 | Wong | G06Q 30/0233 |
| 2020/0320564 | A1* | 10/2020 | Ramesh | G06Q 20/367 |
| 2021/0065279 | A1* | 3/2021 | Mupkala | G06Q 30/0224 |

OTHER PUBLICATIONS

Cox, Christopher, and Scott Sanchez. “Transforming the customer experience: the promise of mobile wallets.” First Data Corporation (2012). (Year: 2012).*

Dorotic, Matilda, et al. “Reward redemption effects in a loyalty program when customers choose how much and when to redeem.” International Journal of Research in Marketing 31.4 (2014): 339-355. (Year: 2014).*

* cited by examiner

REWARDS-BASED PAYMENTS

PRIORITY

This application is a continuation under 35 U.S.C. § 120 of U.S. patent application Ser. No. 16/002,438, filed 7 Jun. 2018, which is incorporated herein by reference.

TECHNICAL FIELD

This disclosure generally relates to services and architectures for electronic payments.

BACKGROUND

Non-cash transactions are common. For example, consumers can purchase goods and services with credit rather than cash. A consumer may provide a credit card to a merchant for payment of a good or service. The merchant typically has a point-of-sale (POS) terminal that connects to a payment network that authorizes the credit card transaction, for example by confirming that the credit card is valid and that the consumer has the necessary credit to purchase the good or service. While physical credit cards may be used, electronic credit cards, such as those provisioned on a mobile wallet, may also be used. Another example of a non-cash payment is a debit card issued by bank.

Rewards programs are a ubiquitous way for payment providers, such as banks, or merchants to incentivize use of their payment products. For example, a bank may provide a rewards program under which a user receives program "points" or "miles" for each transaction made using a credit card issued by that bank. Rewards may be obtained on a per transaction basis, on a basis tied to the amount of the transaction, or both. As another example, a merchant such as a coffee shop may issue a merchant-specific card. A user's purchases from that merchant or, in some cases, from partners of that merchant may result in the user receiving rewards. Typically, a user can redeem rewards for additional goods or services, and in some cases, may redeem rewards as a credit for previously made purchases.

DESCRIPTION OF EXAMPLE EMBODIMENTS

Figure 1:
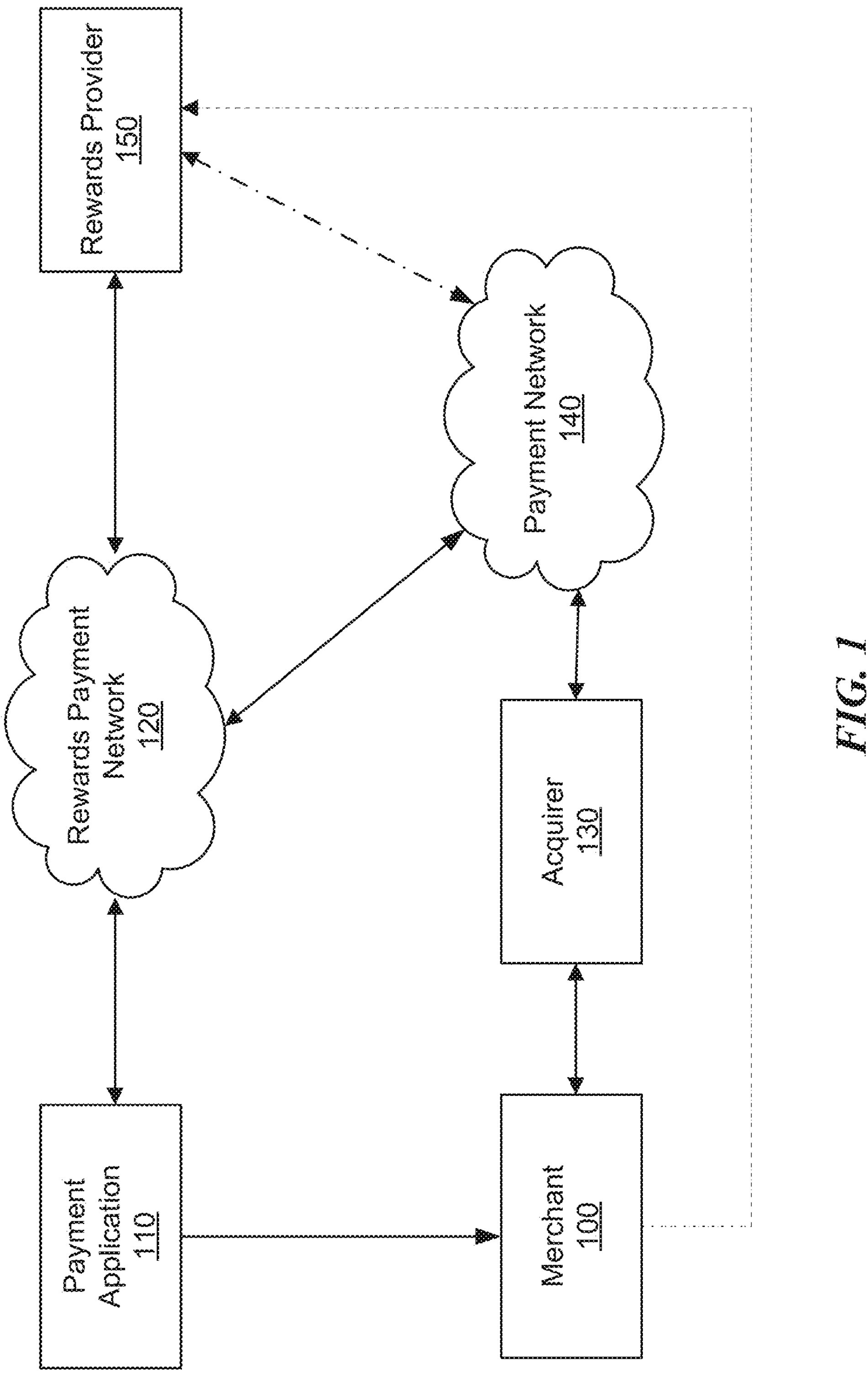
FIG. 1 illustrates an example architecture for enabling rewards-based payments.

This disclosure describes improved architectures, systems, and methods performed thereby for facilitating real-time and after-the-fact rewards-based transactions between users and merchants. Current infrastructure for non-cash transactions, such as credit transactions, is unable to facilitate automatic rewards-based transactions at the point of sale (POS). Instead, under the current infrastructure, a user must provide payment for a good or service in non-reward form (e.g., cash or credit) and then must manually redeem rewards for the transaction. Even further, the user typically cannot use rewards rather than currency (such as the U.S. dollar) to pay for goods or services because merchants typically do not have the infrastructure for validating rewards. This is particularly true when a merchant from whom a user is purchasing goods or services is different than the provider, or issuer, of the rewards. For example, the selling merchant may be unable to validate the particulars of the user's involvement in the rewards program, such as whether a user actually has the rewards the user claims. Even further, the selling merchant may have no use for the rewards provided by another provider, and thus may be unwilling to accept such rewards as payment for a good or service.

The infrastructure for accepting common non-cash payments (such as credit) was and is expensive and burdensome to deploy, as each participating merchant must have a POS terminal capable of interacting with the non-cash payment system to authorize transactions and receive payment. Updating each of these POS terminals, or adding entirely new ones, at the merchant side to accept rewards-based payments for goods and services is an inefficient and ineffective approach to wide-scale, user-friendly adoption of rewards-based payment.

The architectures, systems, and methods described herein do provide a scalable, readily deployable infrastructure for enabling rewards-based payments that provides the user and merchant benefits of such a system without requiring deployment of a revised POS terminal at each participating merchant. In addition, the architectures, systems, and methods described herein provides additional rewards-based payment services and benefits to merchants, users, and reward-program providers, as described more fully herein.

This disclosure contemplates that a provider of a rewards program may be any suitable entity. For example, a provider of a rewards program may be a bank that issues, e.g., a credit or debit card to the user. As another example, a provider may be a merchant, such as an electronics provider, clothes provider, restaurant, or any other suitable merchant. The provider of a rewards program may be the same merchant that a user is currently making a purchase from. For example, a user may be buying a cup of coffee from a particular merchant, and that merchant may also be a provider of a rewards program. In particular embodiments, a provider of a rewards program may be a merchant different than the one whom a user is purchasing goods or services from. For example, a merchant rewards provider may be a clothing store that has issued a credit card to a user, and the user may use that credit card to purchase a cup of coffee from a different merchant. This disclosure contemplates that a rewards provider may be any suitable bank, merchant, group of banks or merchants, or any suitable combination thereof.

FIG. 1 illustrates an example architecture for enabling rewards-based payments. The arrows illustrated in FIG. 1 show the flow of information, as described more fully herein. The dashed arrows indicate optional communication links, as will be described more fully below, but at least one of those links must be present. As explained herein, merchant 100 may be any suitable merchant, and may be a physical or virtual (e.g., web-based) seller of goods or services. A user wishing to purchase goods or services from merchant 100 uses payment application 110 of a client computing device to make the purchase. Payment application 110 may be, for example, a mobile wallet executing on the user's mobile phone. This disclosure contemplates that payment application 110 may be executed by any suitable client computing device of a user, such as a smart watch, a mobile phone, a tablet, a laptop, a desktop, etc. In particular embodiments, payment application 110 may provide a user interface to a user on a client computing device while at least some of the payment application 110 executes on another device, such as a cloud-based server device.

In the example of FIG. 1, Payment application 110 communicates with rewards payment network 120 in order to provide the rewards-based functionality described herein. Rewards payment network 120 may consist of any suitable network components, such as one more or more server computing devices. As described more fully below, this disclosure contemplates any suitable communication protocol or technique between the components of FIG. 1. Payment application 110 may facilitate loading and usage of payment and/or loyalty/membership cards. For example, payment application 110 may contain information about different rewards programs from different reward providers 150 that the user is a part of. In other words, the user may have a rewards program account with several different reward providers 150, and payment application 110 may have access to and/or information about each of those accounts. In particular embodiments, payment application 110 may function as an electronic version of a traditional rewards membership card.

For transactions that use credit rather than rewards, merchant 100 communicates credit-card information of a user via acquirer 130 to payment network 140. For example, acquirer 130 may be a traditional POS terminal used to record credit card swipes. Payment network 140 authorizes the transaction and transmits payment from the credit-card issuer to the merchant. Payment network 140 typically also processes credit-related functions from credit-card issuers and/or merchants. For example, payment network 140 may provision a new card issued by a credit-card issuer.

Credit-card issuers and merchants typically communicate to and through payment network 140. However, rewards payment network 120 enables rewards-based transactions by communicating: (1) with merchants via payment application 110; with reward providers 150; and with payment network 140. Reward providers 150 are the issuers of a reward program, and may also be issuers of credit-based payment methods (e.g., credit cards). As described above, rewards providers may include banks, merchants (including merchant 100), or any other suitable entity.

Because rewards payment network 120 integrates with payment application 110 (and, by extension, the user's client device hosting payment application 110), with reward providers 150, and with payment network 140, rewards payment network 120 can provide the infrastructure and functionality to enable rewards-based payments.

In particular embodiments, rewards payment network 120 may define a standardized mechanism for reward providers 150 to connect their backend system components to the network components of rewards payment network 120 and to provide for communication between the two entities. For example, connections between the two networks may be wired or wireless connections between one or more servers of reward provider 150 and one or more servers of rewards payment network 120. In addition, rewards payment network 120 may define an API that provides the communication protocols that reward providers 150 can use to communicate with rewards payment network 150 to provide the functionality disclosed herein. For example, rewards network 120 may communicate information from a user's payment application 110 to reward provider 150. Such information may include requests for transactions, transaction amounts, or other user-specific information, such as merchants the user is near. In particular embodiments, payment application 110 may obtain user-specific information from the client device it is running on, such as GPS information obtained by the client device, and rewards network 120 may retrieve such information and provide it to reward providers 150 to enhance functionality for both users and reward providers 150.

In particular embodiments, a reward provider 150 communicates to rewards network 120 information about reward provider 150's products, partners, and/or user information, such as rewards balance information. Rewards payment network 120 communicates to reward providers 150 information about the user and user-selected options related to rewards payments.

For example, a reward provider 150 may register with rewards payment network 120 for rewards-based payment services. In particular embodiments, reward provider 150 may identify particular products, merchants 100, rewards programs, payment applications 110, and/or users for which reward provider 150 wishes to obtain rewards-based payment services. In particular embodiments, reward provider 150 may simply request access to such services, enabling them for all payment applications 110 (and corresponding users and rewards programs) that are capable of interfacing with rewards payment network 120 to provide such services.

After a rewards provider 150 registers for rewards-based payment services with rewards payment network 120, a user may provision a particular rewards card or program the user is a part of for use with rewards payment network 120. When the user provisions a new rewards-based payment method, rewards payment network 120 will match the payment method with the corresponding reward provider 150's records. If there is a match, rewards payment network 120 will communicate authorization to payment application 110, and a user interface (UI) of payment application 110 will update to show that the rewards-based payment method is available in application 110. For example, an image of the user's rewards card may appear in the user's mobile wallet as a payment option.

After a rewards-based payment method has been provisioned, a user can select that payment method for payment to merchant 100. As described more fully herein, the user can select rewards-based payment at the POS, before initiating a transaction, or after initiating a transaction. As described more fully herein, a user can also establish rules governing when rewards for a particular payment method are used as payment for one or more transactions.

Payment application 110 provides a UI to the user regarding provisioned rewards-based payment methods. For example, a user may navigate to a particular screen of payment application 110 for a particular payment method. Payment application 110 may display to the user the payment method, the rewards balance and any applicable rules the user has set up for rewards-based payments generally, and/or applicable rules the user has set up specifically for that payment method. Payment application 110 may also display other information, such as redemption dates for rewards, a value of the rewards in some other unit (e.g., in U.S. dollars), and interactive elements that can be selected to pay for a transaction using the rewards and/or to set up new rules regarding payment with the rewards. As explained more fully below, such information may be communicated from reward provider 150 to payment application 110 via rewards payment network 120.

Payment application 110 may surface notifications to a user regarding rewards payment functionality. For example, payment application 110 may surface a notification that rewards-based payment functionality is available using payment application 110. Such notifications may relate to specific payment methods corresponding to reward providers 150 who have registered with rewards payment network 120.

Payment application 110 may provide one or more payment-related UIs to facilitate rewards-based payment for a transaction. For example, payment application 110 may provide a UI that presents rewards balances and/or transaction histories. The UI may present payment options—which, in particular embodiments, may be communicated from reward provider 150 to rewards payment network 120 and then enabled in payment application 110. In particular embodiments, some or all payment options may only be available if point thresholds set by reward provider 150 for that payment method are met. In particular embodiments, a UI may present an interactive element that permits the user to select how many rewards (e.g., points) to redeem towards a particular purchase. In particular embodiments, a user may create rules regarding redemption, either on a per-transaction basis or for multiple transactions. For example, a user may select a fixed percentage of a total transaction amount to redeem with rewards. As another example, a user may redeem rewards regardless of the transaction amount. As another example, a user may use rewards while available and the transaction is under a certain amount. As this example illustrates, rules may involve Boolean logic for particular conditions. Such conditions may be set or provided by the user, by payment application 110, by rewards payment network 120, by reward provider 150, or any suitable combination thereof. In particular embodiments, a default setting for rewards redemption may be applied upon activation of a payment method. In particular embodiments, the default setting may be to not use rewards unless instructed otherwise. In particular embodiments, a UI may provide an interactive element that, when activated, causes the client device (and/or a user account associated with the payment application, whether stored on the client device, in the cloud, or both) to store the user's settings applied to a particular transaction and applies those settings to all or a subset of transactions (e.g., for transactions at the same merchant) going forward.

Figure 2:
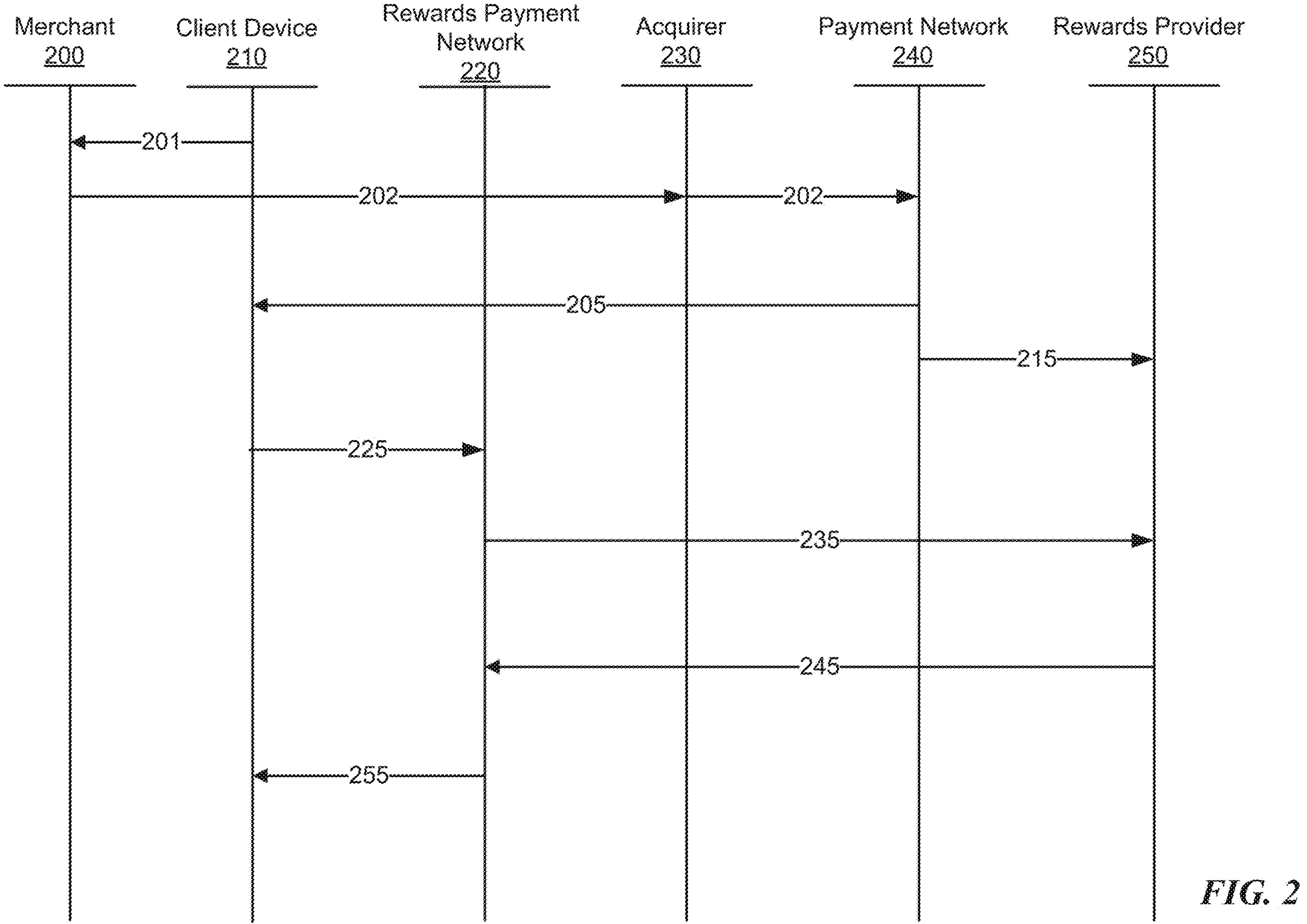
FIG. 2 is a diagram illustrating various interactions between components of a rewards payment system to enable rewards-based payments for a transaction.

FIG. 2 is a diagram illustrating various interactions between payment application 110 of client device 210, rewards payment network 220, acquirer 230, payment network 240, and rewards provider 250 to enable rewards-based payments for a transaction. In the example of FIG. 2, the transaction involves a rewards program associated with a bank card (e.g., a credit card), and thus rewards provider 250 is the bank issuing the payment card.

First, a user identifies a transaction that the user wants to pay with rewards. In this example, the identification can be made at the point of sale or can be made before the point of sale by a predefined rule, as described more fully herein. Then, as illustrated by communication 201, the user uses a non-rewards payment method (which is stored by a payment application on device 210) provided by rewards provider 250 to provide payment to a merchant 200. Merchant 200 transmits payment information 202 to acquirer 230, which transmits corresponding information to payment network 240. The transaction is approved by payment network 240, which communicates a notification 205 to payment application of device 210 identifying, for example, the amount of the transaction, the merchant, and the timestamp of the transaction. Payment network 240 transmits a similar notification 215 to rewards provider 250, who, in this example, is also the issuer of the non-rewards method of payment used by the user to pay for the transaction. Likewise, device 210 sends a communication 225 containing the transaction information and the rewards-based payment settings of the user to rewards payment network 220. Upon receiving notification of the transaction and rewards information, rewards payment network 220 sends an event notification 235 to rewards provider 250 containing, for example, the ID of device 210, the amount of the transaction, and the user's rewards configuration. In particular embodiments, the event notification 235 may include other information, such as a token ID.

Rewards provider 250 matches the information in event notification 235 with the information in notification 215 sent by payment network 240. Rewards provider 250 validates the transaction and then verifies that the user has sufficient rewards to satisfy the desired rewards-based payment. Rewards provider 250 updates the user's account information and then transmits a notification 245 to rewards payment network 220 that the rewards have been applied to pay for the transaction. In particular embodiments, rewards provider 250 may also provide content in notification 245 for rewards payment network 220 to provide to device 210, such as content for a text message or push notification explaining the status of the transaction and/or providing information about the user's rewards account.

Rewards payment network 220 then provides a notification 255 to device 210 regarding the transaction. For example, notification 255 may explain the status of the transaction request (e.g., approved or denied by rewards provider 250). Notification 255 may also update a payment application on device 210 with the user's reward information, such as an updated rewards balance and/or by entering the transaction and corresponding status into the user's transaction history available from the payment application on device 210.

When a rewards provider is not an issuer of a payment method (e.g., a credit card) that interfaces with payment network 240, but rather an issuer of a loyalty-based card, merchant 200 transmit message 202 to rewards provider 250 rather than to payment acquirer 230 and payment network 250. For example, that communication may be made by the connection shown in the dashed line of FIG. 1. Between merchant 100 and rewards provider 150, which may be a rewards interface, particularly when the provider is also the merchant or an affiliate of the merchant. Communications 225 to 255 in FIG. 2 remain the same when rewards provider 250 is not an issuer of a credit card.

FIG. 2 illustrates an example flow for providing payment to a merchant. As explained more fully herein, many other communications are enabled by rewards payment network 220 and payment application on device 210 to facility rewards-based payment functionality. For example, once a rewards-based payment method is activated, rewards payment network 220 may send a call to rewards provider 250 for rewards information for the user. Rewards provider 250 may respond with appropriate information, such as rewards balance and a rewards program name associated with the particular payment method. As described above, these communications may be made in accordance with an API established by rewards payment network 220.

As another example, a transaction events message may be transmitted between components illustrated in FIGS. 1 and 2. For example, when a payment transaction occurs, whether at a physical store point of sale or remotely through an e-commerce initiated purchase channel, the payment application on device 210 may communicate through the rewards payment network 220 a message corresponding to the service option supported by the payment method in the payment application, for example the "pay with points or "points accelerator" options described below. A payment transaction can either be indicated through a transaction notification from payment network 240 for an approved and authorized transaction, through information provided by the rewards provider 250 to the payment application using APIs provided by rewards payment network 220, or through information provided by a point of sale terminal for contactless transactions where two-way data exchange is possible (e.g., near field communication transactions at a point of sale).

As another example, messages from rewards provider 250 can be provided to a payment application on device 210 through rewards payment network 220. For example, upon processing of a transaction event, rewards provider 250 can provide, in response to a transaction event message from rewards payment network 220, information about whether the event was processed successfully (i.e., rewards successfully applied or accumulated), updated rewards balance as a result of the transaction event, and any issuer configuration information used to update settings for the rewards service option enabled (e.g., resetting the amount of rewards to use for rewards-based payment to a preset amount or updating the rewards conversion rate).

As another example, a payment application on device 210 may make at any time a request for the current rewards balance for one or more rewards accounts associated with the payment application. In addition, or the alternative, a payment application may request updated issuer configuration information that can be used to update settings for the rewards service option selected (e.g., resetting the amount of rewards to use for rewards-based payment to a preset amount or updating the rewards conversion rate).

In conjunction with the infrastructure described herein, a payment application on a client device can provide enhanced services associated with rewards-based payments. A payment application can support multiple rewards accounts, and some or all of those accounts may be enabled for enhanced payment services. For enhanced payment service enabled accounts, there may be UI enhancements to display features available for user selection and configuration. In addition, or the alternative, a payment application may surface to the user enhanced-services-related notifications based on transaction events.

For example, a user's reward balance may be displayed directly in the payment application, without requiring navigation to a reward provider's website or application. Rewards balances for an account may be updated whenever the consumer navigates to the UI of the payment application where the reward balance is displayed. In addition, as described above, rewards balances may be updated by the issuer of the rewards payment method when any rewards-based transaction is communicated to a rewards provider.

Enhanced services may include "pay with points" rules that a user can create for rewards-based payments. For example, a user can request—either before, during, or after a user-initiated rewards-based payment—that rewards by a particular rewards provider should be used to offset payment for a transaction. In particular embodiments, the user can choose to apply a fixed amount of rewards to every transaction, either before the transaction or after the transaction, on a one-time, multi-time, or ongoing basis. As another example, a consumer can specify how many rewards to use in a transaction—for example, a fixed amount of rewards to spend, a capped amount of rewards to spend, or a percentage of a transaction to satisfy—using rewards. These specifications may be made on a one-time, multi-time, or ongoing basis. As another example, after a transaction has occurred, the payment application may enable the user to select the transaction from a transaction history to specify for payment using rewards. In particular embodiments, the payment application may surface a notification to a user immediately after the user makes a transaction using a payment method associated with a rewards account, and may ask the user whether the user wants to use rewards from that account towards the transaction. In particular embodiments, one or more rules may apply to all rewards-based payment methods and/or rewards programs. In particular embodiments, one or more rules may apply to all transaction involving a particular rewards-based payment method or rewards program. In particular embodiments, one or more rules may be specific to a merchant, type of transaction, product time, location, or other suitable contextual data. In particular embodiments, a user may explicitly specify the contextual information associated with the rule.

As another example, one enhanced service option of relevance to both users and rewards providers is the ability to leverage additional data from the payment application. This data could be simply the fact that a payment was made by the payment application, or other data available to the application such as contextual information such as geolocation or information about the transaction (merchant info, merchant category, product, etc.) that is available to the application. For example, a user may be travelling near a particular merchant that has a relationship with a rewards provider with whom the user has a rewards account. For example, the merchant may be the rewards provider or may be a partner of the rewards provider. The rewards provider may provide enhanced rewards to the user for engaging in transactions at the merchant, for example, by offering a better redemption rate on rewards used for such transactions. For example, if a user is travelling near a coffee shop, then a rewards provider affiliated with the coffee shop may surface a notification to the user describing a rewards-based discount for the user. As another example, a user searching for a particular type of good or service in a map application may receive notifications regarding vendors of the good or service with whom the user can receive beneficial rewards-based discounts. As another example, one or more rewards provider may use a rewards payment network to deliver time-based and other type of promotions to a payment application. The payment application may present different types of promotions to a user. In particular embodiments, the promotions may be from different rewards providers. The rewards application (and/or the rewards payment network) may rank or otherwise designate the order in which various promotions should appear to a user. For example, ranking may be based on the user's current location and/or on the user's past preferences. In particular embodiments, a ranking or order of promotions displayed on the rewards application may be based on deep machine learning analyzing, e.g., the user's previous behavior.

Figure 3:
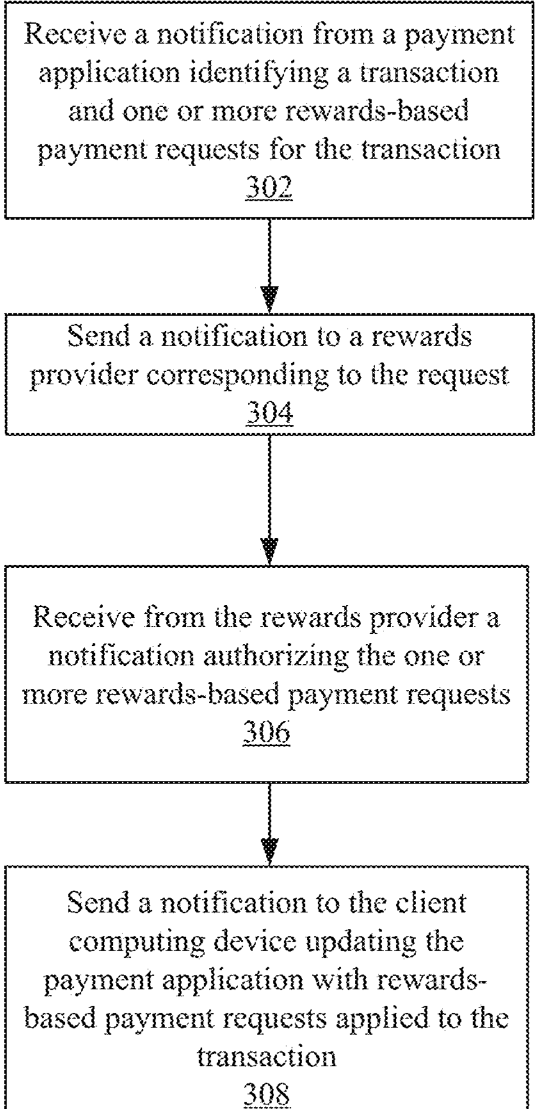
FIG. 3 illustrates an example method for providing a rewards-based payment.

FIG. 3 illustrates an example method 300 for providing a rewards-based payment. Method 300 may be implemented by a rewards payment network, such as the rewards payment networks described in connection with FIGS. 1 and 2.

Method 300 may begin at step 302, where the rewards payment network receives a notification from a payment application on client computing device identifying a transaction and one or more rewards-based payment requests for the transaction. For example, the rewards-based payment requests may be a request to pay for the transaction with rewards and/or a request to utilize one or more payment rules, such as a payment rule set by a user of the payment application. At step 304, the rewards payment network sends a notification to the rewards provider corresponding to the request. For example, the rewards provider may be an issuer of a credit or debit account (e.g., a credit or debit card). The notification sent to the rewards provider may include any suitable information, such as information identifying the transaction, the rewards-based requests, and the user or the client computing device.

At step 306, the rewards payment network receives from the rewards provider a notification authorizing the one or more rewards-based payment requests. As described above, authorization may be provided in response to the rewards provider determining that a payment network associated with, e.g. a credit or debit account has provided a notification verifying the transaction details. At step 308, the rewards payment network sends a notification to the client computing device (i.e., to the payment application) updating the payment application with rewards-based payment requests applied to the transaction. For example, the notification may notify the user that the request is approved. As another example, the notification may update the transaction history and/or the rewards balance for the particular rewards payment method used to pay for the transaction.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing a rewards-based payment, this disclosure contemplates any suitable method for providing a rewards-based payment including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
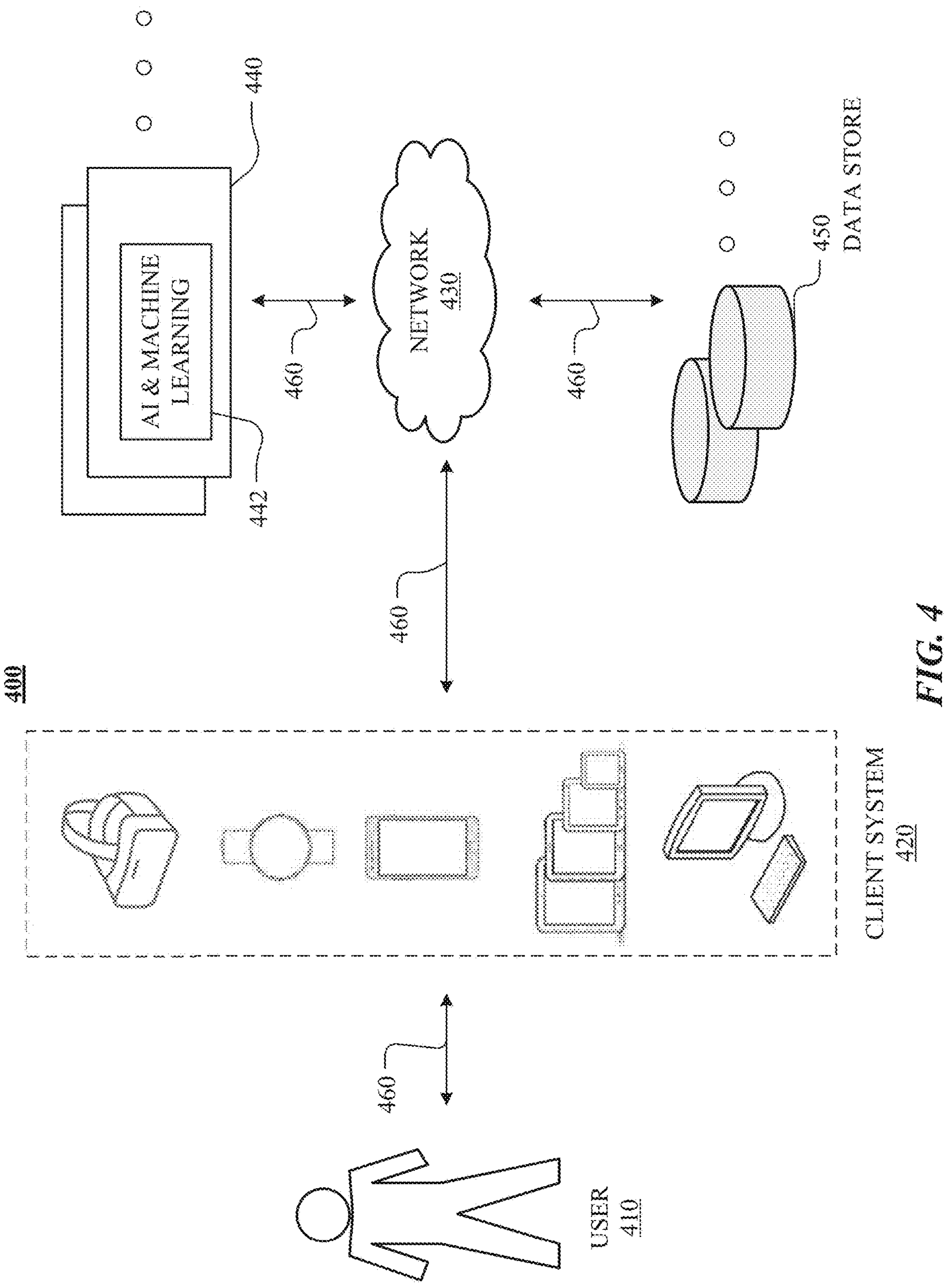
FIG. 4 illustrates an example network environment for particular embodiments of a payment system.

FIG. 4 illustrates an example network environment 400 for particular embodiments of a payment system. Network environment 400 includes a user 410, a client system 420, a network 430, one or more servers 440, and one or more data stores 450. User 410, client system 420, servers 440, and data stores 450 may be connected to each other by network 430 via links 460. Although FIG. 4 illustrates a particular arrangement of user 410, client system 420, network 430, servers 440, and data stores 450, this disclosure contemplates any suitable arrangement of user 410, client system 420, network 430, servers 440, and data stores 450. As an example and not by way of limitation, two or more of client systems 420, servers 440, and data stores 450 may be connected to each other directly, bypassing network 430. As another example, two or more of client systems 420, servers 440, and data stores 450 may be physically or logically co-located with each other in whole or in part. Moreover, although FIG. 4 illustrates a particular number of users 410, client systems 420, networks 430, servers 440, and data stores 450, this disclosure contemplates any suitable number of users 410, client systems 420, networks 430, servers 440, and data stores 450. As an example and not by way of limitation, network environment 400 may include multiple users 410, client systems 420, networks 430, servers 440, and data stores 450.

In particular embodiments, user 410 may be an individual (e.g., human user) or a group (e.g., of individuals) that interacts or communicates with client system 420. In particular embodiments, client system 420 may be any suitable computing device, such as, for example, a wearable computing device, a mobile computing device, a smartphone, a smartwatch, a cellular telephone, a tablet computer, a laptop computer, a personal computer, an augmented/virtual reality device, or any combination thereof. User 410 may interact with one or more of these devices. In addition, these devices may communicate with each other via network 430, directly (e.g., by non-network connections), by any other suitable methods, or any combination thereof. As an example and not by way of limitation, the devices of client system 420 may communicate with network 430 via a wireless communications protocol, such as Wi-Fi or BLUETOOTH. In particular embodiments, client system 420 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 420 may enter a Uniform Resource Locator (URL) or other address directing the web browser to a particular server (such as server 440), and the web browser may generate a Hyper Text Transfer Protocol (HTTP) request and communicate the HTTP request to server. The server may accept the HTTP request and communicate to client system 420 one or more Hyper Text Markup Language (HTML) files responsive to the HTTP request. Client system 420 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, network 430 may be any suitable network. As an example and not by way of limitation, one or more portions of network 430 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 430 may include one or more networks.

In particular embodiments, links 460 may connect client system 420, servers 440, and data stores 450 to network 430 or to each other. This disclosure contemplates any suitable links 460. In particular embodiments, one or more links 460 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 460 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 460, or a combination of two or more such links 460. Links 460 need not necessarily be the same throughout network environment 400. One or more first links 460 may differ in one or more respects from one or more second links 460.

In particular embodiments, servers 440 may be any suitable servers. Each server 440 may be a unitary server or a distributed server spanning multiple computers or multiple datacenters. Servers 440 may be of various types, such as, for example and not by way of limitation, web server, file server, application server, exchange server, database server, proxy server, another server suitable for performing functions or processes described herein, or any combination thereof. In particular embodiments, each server 440 may include hardware, software, or embedded logic components or a combination of two or more such components for carrying out the appropriate functionalities implemented or supported by server 440. In particular embodiments, servers 440 may include one or more artificial intelligence (AI) and machine learning (ML) algorithms 442. In particular embodiments, one or more artificial intelligence (AI) and machine learning (ML) algorithms may be implemented in client system 420. In particular embodiments, the artificial intelligence (AI) and machine learning (ML) algorithms may be deep learning algorithms. In particular embodiments, the artificial intelligence (AI) and machine learning (ML) algorithms 442 may analyze data stored in data stores 450 and provide analyzing results to user 410 through client system 420.

In particular embodiments, data stores 450 may be any suitable data stores. Data stores 450 may be used to store various types of information. In particular embodiments, the information stored in data stores 450 may be organized according to specific data structures. In particular embodiments, each data store 450 may be a relational, columnar, correlation, or other suitable database. Data store 450 may include networked storage such as cloud storage or other network accessible storage. Additionally or alternatively, data store 450 may include local storage within or directly attached to any of the devices of client system 420, such as solid state drives ("SSDs") or hard disk drives ("HDDs"). The network environment illustrated in FIG. 4 is for example only and the network environments are not limited thereof. Although this disclosure describes or illustrates particular types of components and uses of these components of network environment 400, this disclosure contemplates any suitable types of components, any suitable network topology (e.g., including a standalone-device topology), and any suitable uses for these components of network environment 400.

Figure 5:
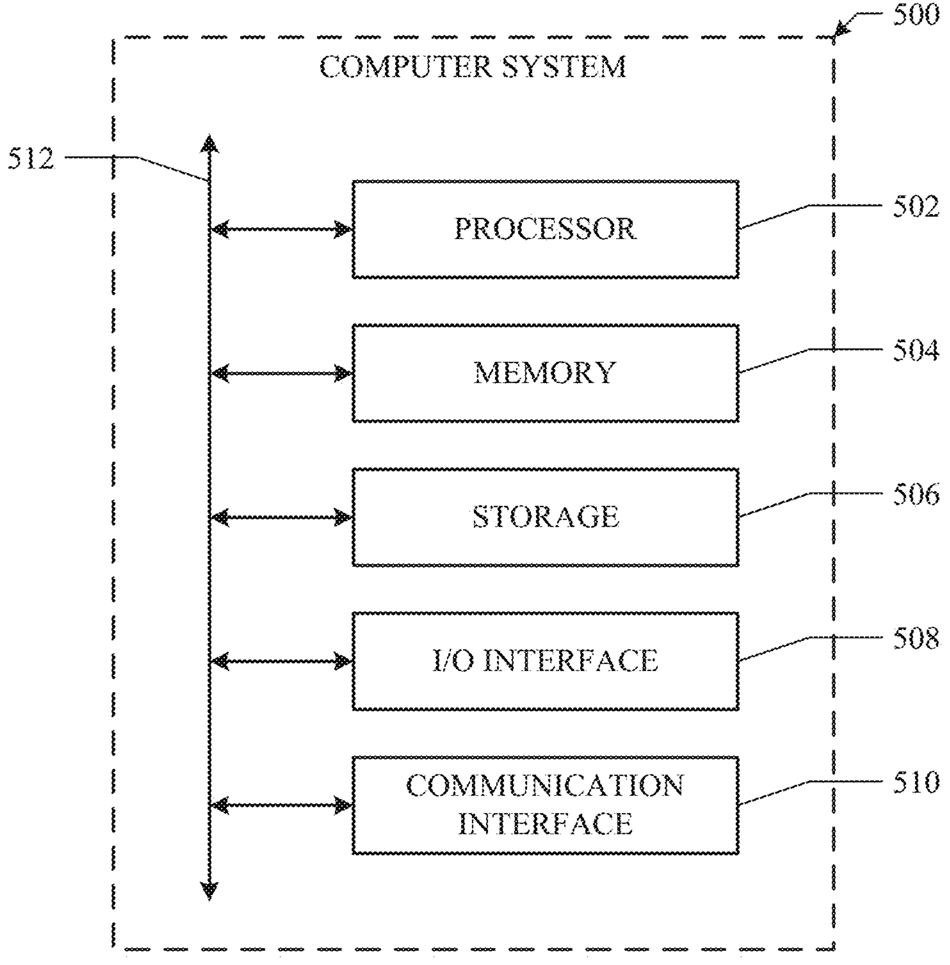
FIG. 5 illustrates an example computer system according to particular embodiments.

FIG. 5 illustrates an example computer system 500 according to particular embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. In particular embodiments, the computer program causes the processor 502 to perform one or more steps of one or more methods described or illustrated herein or provides functionality described or illustrated herein. In this way, the processor 502 coupled to the computer program is a special purpose processor for performing the functions defined by the computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, or may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

receiving, at a server computing device of a rewards network, a request by a user to initiate a transaction associated with a merchant via a payment application on a client computing device associated with the user, wherein the request comprises a request to use a rewards-based payment associated with a rewards provider to offset non-rewards payment for the transaction;

upon determining a match between the rewards-based payment and a rewards account of the user by accessing records of the rewards provider and comparing the rewards-based payment with the records, presenting an option of the rewards-based payment and rewards balance associated with the rewards provider via the payment application;

upon receiving a user selection of the rewards-based payment, accessing one or more rules for using rewards-based payments associated with the rewards provider;

receiving a first notification indicating an authorization of a non-rewards payment of the transaction by a payment network, and wherein the merchant and the payment network are each separate from the rewards network;

sending, by the server computing device of the rewards network, a second notification to the rewards provider, wherein the second notification identifies at least:

the transaction;

the client computing device or the user;

the rewards-based payment request; and the one or more rules;

receiving, at the server computing device of the rewards network and from the rewards provider via the rewards network, an indication of rewards having been applied to offset the non-rewards payment using the one or more rules; and presenting, via the payment application, an updated rewards balance after the rewards having been applied to offset the non-rewards payment.

2. The method of claim 1, wherein:

the rewards provider is an issuer of a profile provisioned on the payment application; and the transaction is processed based on the profile.

3. The method of claim 2, wherein the second notification sent by the server computing device to the rewards provider further identifies the profile provisioned on the payment application, and wherein the indication received at the server computing device from the rewards provider is sent in response to a determination that information in the first notification regarding the transaction corresponds to information in the second notification sent from the server computing device to the rewards provider.

4. The method of claim 3, where in the information in the first notification identifies at least the transaction and information associated with the profile.

5. The method of claim 1, wherein at least one of the one or more rules is configured by a user of the payment application.

6. The method of claim 5, wherein at least one of the one or more rules specifies one or more of an amount of rewards to use for the transaction, a percentage of a quantity of the transaction, a maximum amount of rewards to use, or the entity associated with the transaction.

7. The method of claim 6, wherein the at least one of the one or more rules applies only to the transaction.

8. The method of claim 6, wherein the at least one of the one or more rules applies to the transaction and to one or more future transactions.

9. The method of claim 5, wherein at least one of the one or more rules corresponds to a rule established by the user of the payment application in advance of the transaction.

10. The method of claim 1, further comprising:

presenting an interactive element that, when activated, approves the second notification sent by the server computing device to the rewards provider.

11. The method of claim 1, further comprising:

receiving, by the server computing device, a contextual notification from the client computing device; and sending, by the server computing device to the rewards provider, a contextual notification identifying:

a context of the user; and the user or the client computing device.

12. The method of claim 11, wherein the context of the user comprises a location of the user.

13. The method of claim 11, further comprising:

receiving, from the rewards provider and at the server computing device, a rewards incentive based on the context of the user; and sending, by the server computing device to the client computing device, an incentive notification of the rewards incentive.

14. The method of claim 1, further comprising:

receiving, at the server computing device of the rewards network, contextual information associated with the user from the payment application via the rewards network; and sending, to the payment application, instructions for presenting a recommendation of an entity for rewards-based payment to the user, wherein the entity is identified based on analyzing the contextual information and previous behavior associated with the user by one or more machine-learning models.

15. The method of claim 14, further comprising:

selecting, based on the contextual information, a plurality of entities available for rewards-based payments;

ranking the plurality of entities based on analyzing the contextual information and previous behavior associated with the user by one or more machine-learning models; and sending, to the payment application, instructions for presenting the ranked entities to the user for rewards-based payments, wherein the ranked entities comprise the merchant.

16. The method of claim 1, wherein applying the rewards to offset the non-rewards payment is conducted by the rewards provider, comprising:

validating, by the rewards provider, the transaction based on the second notification; and verifying that the user has sufficient rewards to satisfy the request to use the rewards-based payment.

17. One or more computer-readable non-transitory storage media embodying software that is operable when executed to:

receive, at a server computing device of a rewards network, a request by a user to initiate a transaction associated with a merchant via a payment application on a client computing device associated with the user, wherein the request comprises a request to use a rewards-based payment associated with a rewards provider to offset non-rewards payment for the transaction;

upon determining a match between the rewards-based payment and a rewards account of the user by accessing records of the rewards provider and comparing the rewards-based payment with the records, present an option of the rewards-based payment and rewards balance associated with the rewards provider via the payment application;

upon receiving a user selection of the rewards-based payment, access one or more rules for using rewards-based payments associated with the rewards provider;

receive a first notification indicating an authorization of anon-rewards payment of the transaction by a payment network, and wherein the merchant and the payment network are each separate from the rewards network;

send, by the server computing device of the rewards network, a second notification to the rewards provider, wherein the second notification identifies at least:

the transaction;

the client computing device or the user;

the rewards-based payment request; and the one or more rules;

receive, at the server computing device of the rewards network and from the rewards provider via the rewards network, an indication of rewards having been applied to offset the non-rewards payment using the one or more rules; and present, via the payment application, an updated rewards balance after the rewards having been applied to offset the non-rewards payment.

18. A server computing device comprising:

one or more non-transitory computer-readable storage media embodying instructions; and one or more processors coupled to the media and configured to execute the instructions to:

receive, at a server computing device of a rewards network, a request by a user to initiate a transaction associated with a merchant via a payment application on a client computing device associated with the user, wherein the request comprises a request to use a rewards-based payment associated with a rewards provider to offset non-rewards payment for the transaction;

upon determining a match between the rewards-based payment and a rewards account of the user by accessing records of the rewards provider and comparing the rewards-based payment with the records, present an option of the rewards-based payment and rewards balance associated with the rewards provider via the payment application;

upon receiving a user selection of the rewards-based payment, access one or more rules for using rewards-based payments associated with the rewards provider;

receive a first notification indicating an authorization of a non-rewards payment of the transaction by a payment network, and wherein the merchant and the payment network are each separate from the rewards network;

send, by the server computing device of the rewards network, a second notification to the rewards provider, wherein the second notification identifies at least:

the transaction;

the client computing device or the user;

the rewards-based payment request; and the one or more rules;

receive, at the server computing device of the rewards network and from the rewards provider via the rewards network, an indication of rewards having been applied to offset the non-rewards payment using the one or more rules; and present, via the payment application, an updated rewards balance after the rewards having been applied to offset the non-rewards payment.

* * * * *